Patented July 3, 1951

2,558,942

UNITED STATES PATENT OFFICE 2,558,942

SANITIZING COMPOSITION

Craig Eagleson, Washington County, Oreg.

No Drawing. Application February 3, 1947,
Serial No. 726,241

7 Claims. (Cl. 167—30)

The present invention relates to sanitizing compositions. More particularly, the invention pertains to compositions for use as disinfectants, deodorants and insecticides which are particularly applicable around dairies, barns, poultry houses and the like.

A primary problem to be overcome in disinfecting and deodorizing, i. e., in "sanitizing" barns and similar animal quarters is presented by the occurrence in these environments of organic matter which decomposes slowly over a substantial period of time to form ammonia and other malodorous gases. Also present is the problem of combining in a single sanitizing composition constituents which are compatible with each other and which will have sustained insecticidal and germicidal capacities in addition to serving an enduring deodorizing function. It is toward the solution of these and other problems that the present invention is directed.

It is therefore the general object of the invention to provide a disinfectant, deodorizing and insecticidal composition having sustained activity over a long period of time.

A further object is to provide a sanitizing composition which will react with ammonia and other malodorous gases formed by the decomposition of organic material.

A further object is to provide a composition applicable to the sanitizing of dairies, barns, poultry houses, animal quarters and the like which composition acts to retain the ammonia and other nitrogen compounds formed by the decomposition of organic material present in such environments so as to preserve them for fertilizer use.

A further object is to provide a sanitizing composition which, while effective in destroying the noxious odors emanating from deteriorating organic material, does not concurrently destroy the usefulness of such material as a fertilizer, as do caustic materials such as free lime.

A further object is the provision of a disinfecting and deodorizing composition which effectively permeates surfaces and contacts entities to which it is applied.

A further object is to provide a composition which is stable during storage and need not be protected by special containers.

The foregoing and other objects of the invention are accomplished by providing a novel composition of matter comprising broadly an inorganic chlorine- or hypochlorous acid-liberating compound, an acid-acting salt of an inorganic acid, an organic chlorine-containing insecticidal compound and, if necessary, a basic-acting material added for pH control.

The first named of these constituents comprises an inorganic hypochlorite characterized by the ability of decomposing, particularly in the presence of moisture, to form nascent chlorine which is active against micro-organisms and malodorous compounds and which serves disinfecting and deodorizing functions. Representative hypochlorites which may be used to advantage in the compositions of the invention are the hypochlorites of calcium, magnesium, sodium and potassium. The mixed salts, for example the chloro-hypochlorites, of these and other metals also may be used, where such mixed salts exist. Preferred chlorine-liberating compounds are calcium chloro-hypochlorite, commonly known as chloride of lime, and calcium hypochlorite, commonly known as "Perchloron" or "H-T-H powder."

The acid-acting salt of an inorganic acid which also is a constituent of the compositions of the invention serves the function of combining with odoriferous compounds such as ammonia and amino compounds formed by the gradual decomposition of nitrogenous organic matter, even though such odoriferous compounds may be formed over a substantial period of time. During this process, the ammonia or amino compounds enter into chemical combination with the acid-acting salt to form ammonium salts. They therefore are not lost to the atmosphere as they otherwise would be. Rather, they are sealed or locked within stable compounds of low vapor pressure which are valuable as plant nutrients.

Suitable acid-acting salts comprise the acid phosphates and sulphates of the metallic elements, especially calcium, magnesium, aluminum, zinc, chromium, iron and copper. These may be used singly or in admixture with each other. Preferred members of the group are the acid phosphates of calcium, especially primary calcium phosphate, or mono-calcium phosphate, $Ca(H_2PO_4)_2$. This is produced by treatment of rock phosphate with a strong mineral acid such as sulfuric acid or phosphoric acid and is sold as a technical mixture of the primary and secondary calcium phosphates together with some residual tertiary calcium phosphate and by-products such as gypsum. Regardless of its mixed character, it may be used in the compositions of the invention when admixed with suitable conditioning materials as is more fully described hereinbelow.

Also included in the mixture is an organic chlorine-containing insecticidal compound of high molecular weight, which compound is a member of the group consisting of dichlorodiphenyl-trichloro-ethane, commonly known as DDT; methoxy dichlorodiphenyl-trichloro-ethane; dichlorodiphenyl-dichloro-ethane (DDD), hexachloro-cyclohexane ("666," or benzene hexachloride); dianysil-trichloro-ethane; the chlorinated bicyclic terpenes ("Toxaphene"; Hercules Powder Company); and chlorinated naphthalene ("1068"; Velsicol Corporation). These compounds have in common the unique properties of high and sustained activity as contact insecticides, a relatively high content of chlorine, a molecular weight of above 250, low vapor pressure, lipoid solubility, and compatibility with the other constituents of the compositions of the invention. They therefore impart to these compositions the ability to kill certain insect pests present in or on the materials to which the composition is applied, over a sustained period of days or weeks.

A further constituent of the compositions of the invention may be material added to control the inherent latent acidity or pH of the composition. This factor is of significance since an inorganic hypochlorite is a primary ingredient thereof. As is well known, the decomposition of compounds of this type to liberate free chlorine is caused or permitted by the presence of acidic materials. Such materials may be present in the compositions of the invention in the form of free acids contained, for example, in technical monocalcium phosphate (super phosphate of lime). Hence it is desirable to include a basic material which will buffer or in part neutralize the free acid and stabilize the composition against decomposition in the absorbed moisture unavoidably present.

It will be apparent, however, that if an excessive amount of basic-acting material is incorporated in the composition, it will tend to combine with the acid phosphate or acid sulfate present and destroy the ability of these acid salts to exercise their desired function of combining with nitrogenous bases, e. g. ammonia, which are evolved by the decomposition of organic matter in the environments in which the sanitizer is applied. Furthermore, the presence of such an excess may have the deleterious effect of adversely affecting the insecticidal activity of the organic chlorine-containing insecticide which also may be a constituent of the composition. Due perhaps to their isomerization under the influence of free alkali in alkaline environments, or to other causes not precisely known, certain compounds of this class demonstrate decreased activity toward insects when used in media which are too highly alkaline. Hence it is important to control the pH of the compositions.

It has been found that the desired control may be had by the incorporation in the compositions of the invention of basic-acting materials of a kind and in an amount sufficient to neutralize any free acid which may be present without combining with the acid acting salts, e. g. the calcium acid phosphate, contained in the composition. The free organic and inorganic bases, and the basic acting salts thereof may, in general, be used for this purpose. Compounds such as calcium carbonate, which, although not basic per se, are capable of reacting with acidic materials also may be used. Representative basic-acting materials, therefore, include sodium hydroxide, potassium hydroxide, calcium hydroxide, calcium oxide, sodium bicarbonate, potassium carbonate, potassium bicarbonate, tertiary sodium phosphate, tertiary calcium phosphate, calcium carbonate, magnesium carbonate, ammonia, ammonium hydroxide, tetramethyl ammonium hydroxide, and the like. It is preferred in most cases to use ordinary slaked lime, i. e. calcium hydroxide.

It also is desirable to incorporate a wetting agent in the mixtures. These materials are in effect surface active agents best selected from the group of wetting agents having as the hydrophobic part of the molecule hydrocarbon chains or alkyl radicles containing from 12 to 18 carbon atoms or derivatives of the same, and hydrophylic or solubilizing radicles such as the sulfate, sulfonate, amine, amide, hydroxyl, carboxyl, and phosphate radicles. Typical of such wetting agents are the sodium salts of sulfated lauryl alcohol and sulfated oleyl alcohol, naphthalene sulfonic acid esters, tertiary amine salts, lauryl dimethyl amine hydroacetate, the sodium salts of sulfated coconut oil, the fatty acid esters of polyalkylene glycols, the sulfated boro-amide esters of alkyl compounds and sulfated fatty acids.

These impart to the mixtures in which they are contained enhanced ability to contact moist surfaces and permeate particles enclosed in films of liquid so that a more efficient sanitizing action is obtained. The wetting agents perform another valuable function in that they enhance to an unexpected and surprising degree the insecticidal activity of the organic chlorine-containing insecticidal compounds present in the mixture. Such compounds are unique in being active in disrupting the protoplasm of nerve cells and hence in killing insects with which they come in contact. This action is made possible in part by the fact that the insecticides show a moderate-to-high solubility in oleaginous material and hence have the ability to attack the nuclear elements involved in the transmission of nerve impulses, which elements are emulsions in which the internal phase is lipoid in character. In dry environments, therefore, the insecticides readily penetrate the integument of insects which they contact and are highly insecticidal.

However, the situation is otherwise in moist environments such as dung- and urine-soaked floors and, particularly, dung heaps, where agricultural sanitizing compositions may be applied. In the first place, the moisture present in such environments tends to envelop particles of the oil-soluble hydrophobic insecticide, thereby to render it ineffective. In the second place, it forms an aqueous film on the epidermis of the integument of insects living in or on such places. The presence of this film tends to prevent access of water-insoluble foreign materials such as insecticides of the class described herein to the sensory pits, to the filaments of protoplasm extending through the hypodermic, or ingress through the non-chitinized intersegmental membrane, all of which afford possible means of entry of the insecticide into the body of the insect. This is particularly true where the insects concerned are flies, which have on their feet a sticky substance excreted by the tenant hairs of the tarsi. In such situations, it is very difficult or even impossible to secure the amalgamation of the insecticide with the protoplasm of the insect necessary to result in the death of the latter.

It has been discovered that this difficulty may be overcome by using DDT and related insecticides together with a wetting agent which serves the function of disrupting the surface film of water which may be present about the particles of insecticide, or over the epidermis of insects which it is desired to kill. As a result, there is obtained more rapid and certain contact between insecticide and the insect protoplasm and the killing power of the insecticide is increased greatly.

A further beneficial inter-relationship between the components of the composition of the invention is the synergism existing between the wetting agent and germicidal constituent of the composition, i. e. the inorganic hypochlorite.

Any change in the physical characteristics of the medium in which they live profoundly affects the growth characteristics of micro-organisms. Materially to lower the surface tension of the medium makes growth and even continued life impossible for many species. Hence the introduction into the compositions of the invention of wetting agents which lower the surface tension of the medium imparts to the compositions enhanced toxicity toward bacteria as well as toward insects.

Since one of the primary purposes of the invention is to provide a sanitizer for piles of manure, it may be desirable to include in the sanitizer composting elements which will increase the value of the manure as a fertilizer. These comprise the so-called trace elements which have a stimulating effect on plant growth even though present in but very small amounts. Composting materials having such an action comprise, for example, compounds of boron, copper, magnesium, manganese, silicon, zinc, iron and the like.

The active ingredients of the composition being effective in relatively small amounts, it usually is desirable to make up the bulk of the composition with a filler. This may comprise any readily available, substantially inert material which does not affect adversely any of the active components. Suitable fillers include finely divided minerals such as talc, diatomaceous earth and limestone as well as wood flour, wood fiber and the like.

The amounts of the foregoing materials which may be admixed to formulate the sanitizing compositions of the invention are somewhat variable depending upon their identity and the specific use to which the compositions is to be applied. Generally stated, however, the inorganic hypochlorite may be used in an amount which lies within the range of between about 0.1% and about 3.0% by weight, based on the total weight of the composition. The inorganic phosphate is used in amount sufficient to combine with the ammonia evolved during decomposition of the nitrogenous matter on which the compositions are applied, which amount may lie within the range of between about 1.0% and about 20.0% by weight. Only relatively small quantities of the highly active organic chlorine-containing insecticidal compound, e. g. DDT, need be employed, quantities of between about 0.1% and about 2.0% by weight being sufficient in the usual case. The wetting agent used to enhance the insecticidal value of the DDT and the bactericidal value of the inorganic hypochlorite likewise is active in very low concentrations. Amounts of this material range from about 0.01% to about 1.0% by weight. The quantity of basic-acting substance employed as a buffer is variable, and is determined by the acidity of the mixture, which in turn is determined principally by the source and amount of the acid acting salt of an inorganic acid used. It is used, however, in quantities sufficient to neutralize any free acid which may be present without combining with the acid acting salts, e. g. the calcium acid phosphate, contained in the composition. Composting materials are added, if at all, in very small amounts, sufficient only to supply to the mixture a desired quantity of growth-promoting trace elements. The balance of the composition is comprised of an inert material, or filler, used in quantity sufficient to bring the total content up to a weight percent of 100, when the amounts of the other materials are within the ranges outlined above.

Representative formulas illustrating more specifically the amounts and relative proportions of the various ingredients compounded to formulate the sanitizing compositions of the invention are as follows, wherein the amounts are expressed in weight percent:

*Example 1*

| | |
|---|---|
| Chlorinated lime | 0.3 |
| Dichlorodiphenyl-trichloro-ethane | 0.25 |
| Calcium acid phosphate | 1.75 |
| Wetting agent (sulfated boro-fatty acid amide) | 0.02 |
| Hydrated lime | Quantity sufficient |
| Filler (limestone flour) | Remainder |

*Example 2*

| | |
|---|---|
| Calcium hypochlorite | 0.2 |
| Hexachloro-cyclohexane | 1.0 |
| Mono calcium phosphate | 3.0 |
| Wetting agent | 0.1 |
| Lime | Quantity sufficient |
| Filler | Remainder |

In a like manner are formulated compositions whereof methoxy dichlorodiphenyl-trichloroethane, dichlorodiphenyl-dichloro-ethane, dianysil-trichloro-ethane, the chlorinated bicyclic terpenes, and chlorinated naphthalene are substituted for the DDT, and wherein calcium acid sulphate is substituted for the calcium phosphate of the above examples.

The compositions of the invention may be compounded in any suitable manner, as by mixing together the component materials in a dry state and to a sufficient degree to form an intimate mixture thereof. It usually is desirable to have the materials in a finely divided or powdered condition. It also is desirable to incorporate in the mixture a material which will prevent or minimize the decomposition on storage of the inorganic hypochlorite content of the composition and will offset the hygroscopicity of technical grades of super phosphate. Such a material comprises a hydrocarbon oil having a viscosity of between about 100 seconds and about 400 seconds Saybolt at 100° F., used in an amount of from about 0.1% to about 1.0% by weight of the final composition. When the surfaces of the particles of inorganic hypochlorite are thus coated with oil, access thereto during storage of atmospheric gases such as water vapor and carbon dioxide is inhibited with the result that their disintegration to liberate chlorine is minimized.

When a hydrocarbon oil is incorporated in the mixture to serve the purpose indicated the composition may be as follows (per cent by weight):

*Example 3*

| | |
|---|---|
| Calcium chlorohypochlorite | 0.5 |
| Mono calcium phosphate | 2.0 |
| Dichlorodiphenyl-trichloro-ethane (50% mixture with talc ground to particle size of less than 50 microns) | 2.0 |
| Wetting agent | 0.05 |
| Hydrated lime | Quantity sufficient |
| Hydrocarbon oil (viscosity 200 seconds at 100° F.) | 0.3 |
| Limestone flour | Balance to 100% by weight |

This composition is formulated by blending together the calcium chlorohypochlorite and the wetting agent and spraying the hydrocarbon oil on these materials while they are being mixed and agitated. This causes the chemically active particles of the mixture to be covered by a hydrocarbon film. The resulting mixture is then intimately blended with the limestone flour, the dichlorodiphenyl-trichloro-ethane, the hydrated lime, and the mono calcium phosphate until there is obtained uniform distribution of the ingredients throughout the mass.

There thus is provided a disinfecting, deodorizing and insecticidal composition in which the various constituents cooperate with each other to produce a composition which is stable during storage, which effectively contacts and permeates a variety of surfaces and which after application has a long sustained activity. It is a versatile material which may be applied to divers types of installations including dairies, barns, poultry houses, privies, rabbitries, or quarters used for the raising of fur-bearing animals. Since it is nontoxic to animals, it may also be applied to the skins of animals to kill various parasites.

What I claim is:

1. A sanitizing composition comprising about 0.3 part by weight chlorinated lime, about 2 parts by weight calcium acid phosphate, about 0.25 part by weight dichlorodiphenyl-trichloro-ethane, a relatively minor proportion of a wetting agent, and a filler comprising limestone flour in amount sufficient to bring the total weight of the composition to about 100 parts by weight.

2. A sanitizing composition comprising calcium hypochlorite, calcium acid phosphate, dichlorodiphenyl-trichloro-ethane, a wetting agent, and a filler comprising limestone flour.

3. A sanitizing composition comprising calcium hypochlorite, calcium acid phosphate, dichlorodiphenyl-trichloro-ethane, a wetting agent, and a filler.

4. A sanitizing composition comprising from about 0.1% to about 3.0% of calcium hypochlorite, from about 1% to about 20% of calcium acid phosphate, from about 0.1% to about 2.0% of an organic chlorine-containing insecticidal compound comprising at least one member of the group consisting of dichlorodiphenyl-trichloro-ethane, methoxy dichlorodiphenyl-trichloro-ethane, dichlorodiphenyl-dichloro-ethane, hexachloro-cyclohexane, dianysil-trichloro-ethane, the chlorinated bicyclic terpenes, and chlorinated naphthalene; a relatively minor proportion of a wetting agent, and a filler material in amount sufficient to bring the total amount of the components to about 100%, per cent being expressed as per cent by weight.

5. A sanitizing composition comprising calcium hypochlorite, calcium acid phosphate, a wetting agent, a filler and an insecticidal compound comprising at least one member of the class consisting of dichlorodiphenyl-trichloro-ethane, methoxy dichlorodiphenyl-trichloro-ethane, dichlorodiphenyl-dichloro-ethane, hexachloro-cyclohexane, dianysil-trichloro-ethane, the chlorinated bicyclic terpenes, and chlorinated naphthalene.

6. The sanitizing composition of claim 5 wherein the insecticidal compound comprises dianysil-trichloro-ethane.

7. The sanitizing composition of claim 5 wherein the insecticidal compound comprises chlorinated naphthalene.

CRAIG EAGLESON.

REFERENCES CITED

The following references are of record in the file of this patent:

UNITED STATES PATENTS

| Number | Name | Date |
|---|---|---|
| 462,476 | Doughty | Nov. 3, 1891 |
| 1,555,474 | Mathias | Sept. 29, 1925 |
| 1,965,304 | Adler | July 3, 1934 |
| 2,032,173 | Johnson et al. | Feb. 25, 1936 |
| 2,071,091 | Taylor | Feb. 16, 1937 |
| 2,145,015 | Seaton | Jan. 24, 1939 |
| 2,263,948 | Halvorson | Nov. 25, 1941 |
| 2,369,097 | Wilkins | Feb. 6, 1945 |
| 2,420,928 | Bousquet | May 20, 1947 |
| 2,430,288 | Flenner | Nov. 4, 1947 |

FOREIGN PATENTS

| Number | Country | Date |
|---|---|---|
| 571,484 | Great Britain | Aug. 27, 1945 |
| 570,704 | France | May 6, 1924 |
| 547,874 | Great Britain | Sept. 15, 1942 |
| 658,739 | Germany | Apr. 12, 1938 |
| 11,601 | Great Britain | 1905 |